June 9, 1931. C. L. MATTISON 1,809,054
CHAIN FEED DRIVE
Filed March 23, 1925 2 Sheets-Sheet 2
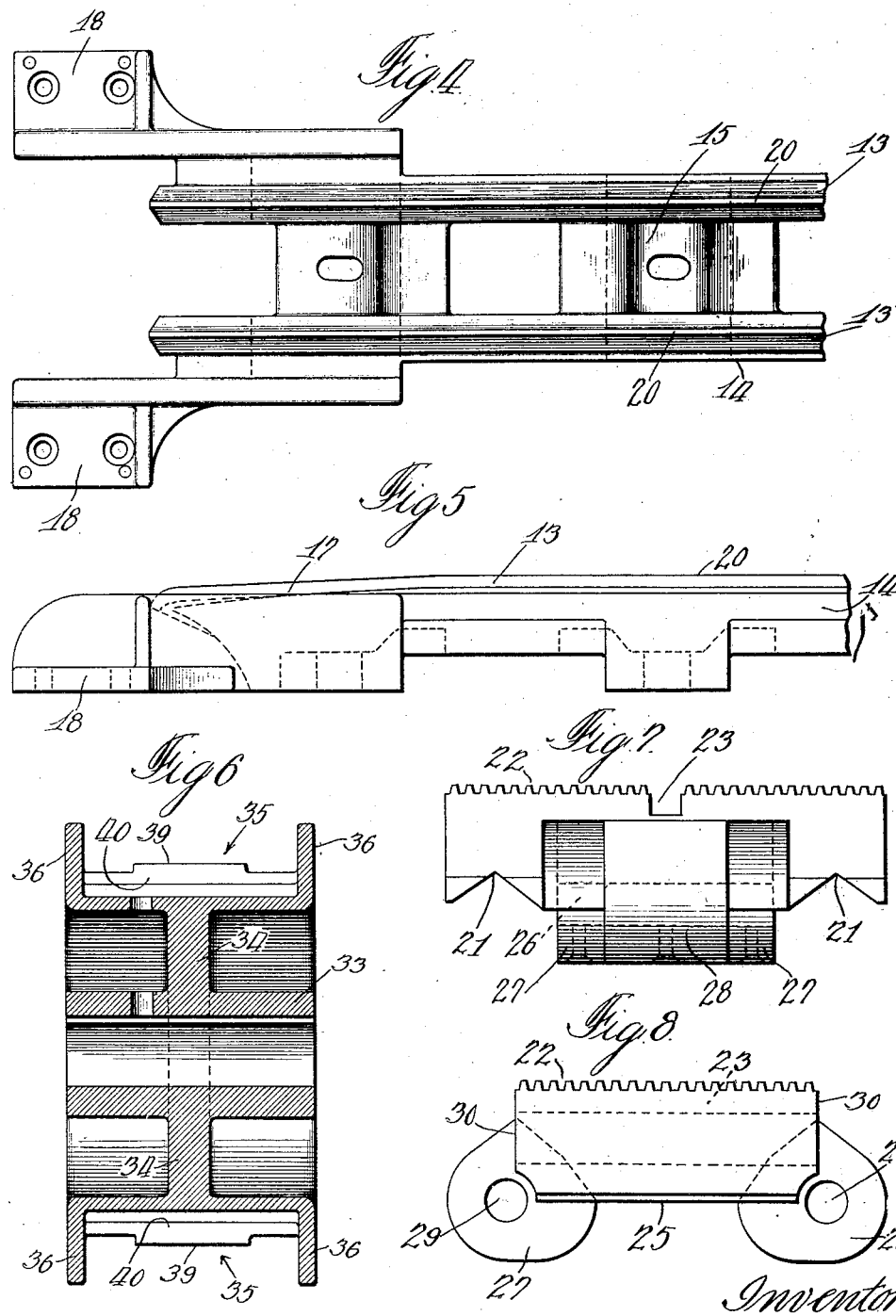

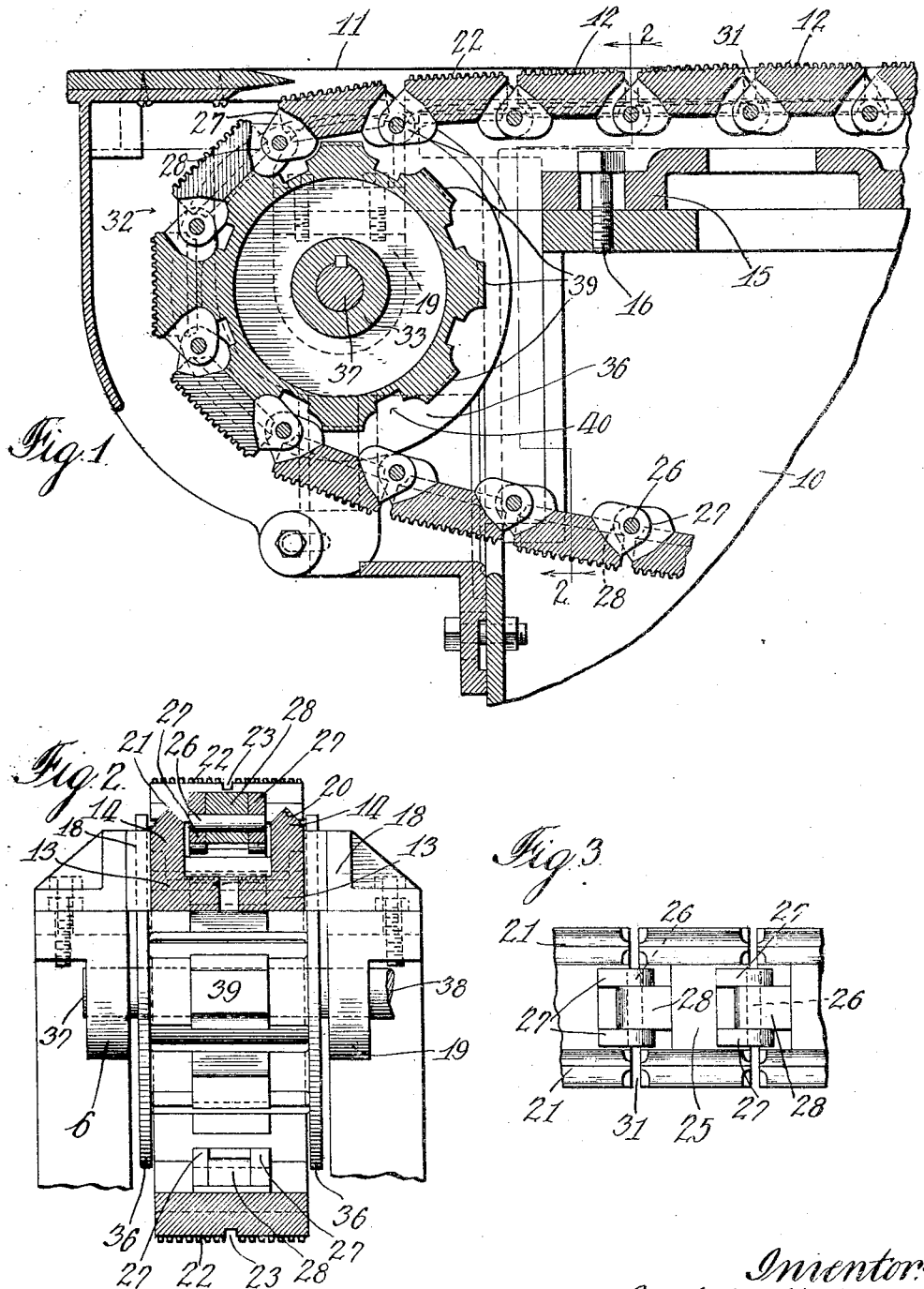

Patented June 9, 1931

1,809,054

UNITED STATES PATENT OFFICE

CARL LAWRENCE MATTISON, OF ROCKFORD, ILLINOIS, ASSIGNOR TO MATTISON MACHINE WORKS, OF ROCKFORD, ILLINOIS, A CORPORATION OF ILLINOIS

CHAIN FEED DRIVE

Application filed March 23, 1925. Serial No. 17,545.

This invention relates to sawing machines and other machine tools of the chain-feed type, and particularly to an improved construction for the chain-feed mechanism.

Heretofore, in devices of this character considerable trouble has been experienced in the passage of the chain around the sprocket. The chain frequently failed to mesh properly with the sprocket, thus giving a jerky drive at such times and causing undue tension or strain in the joints passing over the sprocket. Such conditions tend to cause damage to the machine as well as to the work being operated upon.

One of the objects of the invention is to provide an improved construction of the chain and its driving sprocket which is very strong and rugged, which provides a very positive and smooth feed of the chain, which eliminates any danger of slippage in the driving relation between the sprocket and the chain, and which relieves the chain of undue strain in passing around the sprocket.

Another object of the invention is to provide an improved means for supporting and guiding the upper run of the chain which constitutes the table on which the work rests and is thereby fed to the saw or other tool.

Still other and ancillary objects and advantages of the invention will be understood when taken in connection with the accompanying drawings, in which Figure 1 illustrates a longitudinal cross section of the chain and sprocket.

Fig. 2 is a transverse cross section taken on line 2—2 of Fig. 1, showing the chain and guides in cross section and the sprocket in elevation.

Fig. 3 is a fragmentary view of the under side of the upper run of the chain.

Fig. 4 is a plan view of an end portion of the trackway supporting the chain shown in Fig. 1.

Fig. 5 is a side elevation of the trackway shown in Fig. 4.

Fig. 6 is a cross sectional view of the sprocket wheel.

Fig. 7 is an end elevation of a chain block.

Fig. 8 is a side elevation of the same block.

While I have shown in the accompanying drawings and will herein describe in detail the preferred embodiment of the invention, it is to be understood that this disclosure is given for the purpose of illustrating the invention and represents but one specific manner of carrying out the invention. It is not intended as a limitation of the invention to the construction disclosed. In the appended claims, I aim to cover all modifications and alternative constructions falling within the scope of the invention as limited by the state of the prior art.

According to the present invention, the above-mentioned defects of former chain drives are eliminated by the provision of a novel construction and relation of the links and the sprocket. It is clear that in an endless chain having an appreciable thickness the inner periphery of the chain and the outer periphery are of different lengths. In a single link, opposite points in the two peripheries therefore must travel different paths in a complete revolution of the chain, the outer point traveling the greater distance. When part of the traveled path of the chain is in a plane, such as is the case when the chain passes along a flat table of the machine, the two points travel at the same speed so that in the curved portions of the path at least one point must have a different velocity from that which it has when traveling in the plane. It is further obvious that there is one point in the thickness of the chain that maintains a uniform velocity and that this point must lie in the plane in which the chain links are hinged together. This point in the hinging plane travels at a uniform rate over the sprocket and over the table. Every point outside the hinging plane has an increased velocity as the point passes over the sprocket, and every point inside the hinging plane has a decreased velocity in passing over the sprocket. Therefore, as two pivoted links approach the sprocket from a linear travel there will be corresponding points in the two links which will move relatively to each other, i. e., either toward or away from each other. There will be other points which remain in the same planar relation to each other. These points lie, of course, in the hinging plane of the two links as it passes over the table portion of the machine.

The present invention aims to engage the links with the sprocket along the hinging plane so as to eliminate the creeping or relative slipping between the chain and the sprocket that has characterized prior constructions. In the drawings I have shown a preferred construction whereby each link has a plane inner face lying in the hinging plane referred to and has pivot lugs projecting beyond said plane inner face, and the sprocket is provided with cooperating flat faces and with suitable valleys for receiving said pivot lugs. The construction and operation will be clear from the following detailed description.

The machine herein shown as embodying the invention has a frame 10 having a top flat table surface designated 11. The chain comprises a series of blocks or links 12 hinged together and guided and supported for travel along the table by ways 13 (Figs. 2, 4 and 5). The ways comprise in this instance a rigid track member having upright rails 14 with cross webs 15 in which bolts 16 secure the track to the frame 10. The ways 13 have at the end inclined portions 17 which let the blocks drop away from and below the table top 11, as clearly shown in Fig. 1. Wing brackets 18 laterally forward of the ends of the track provide a support for mounting sprocket bearings 19 in rigid association with the track member. In the present instance, but one end of the track and but one sprocket member are shown, the construction being substantially duplicated on each end. The tops of the ways 13 are V-shaped with a flat apex 20 formed to eliminate the danger of injury to an otherwise sharp edge and further to insure that pressure on the ways will be taken at the inclined surfaces of the V rather than on the apex.

Each chain block 12 is constructed to slide along the ways by the provision of parallel V-shaped grooves 21 (Figs. 2, 3 and 7) formed in the under side of the block. The top of the block is preferably serrated as shown at 22 and is provided with a longitudinal groove or channel 23 into which the saw or like tool, with which the machine is provided, can project to insure its cutting through the material carried on the chain.

In accordance with the invention as above outlined, the undersides of the blocks are planar as indicated at 25 and the blocks are hinged together in the plane of the under faces 25 by the pins 26. Between the grooves 21 of each block there are provided lugs for support of the pivotal pins 26. At one end there are two spaced lugs 27 and at the other end a single lug 28 adapted to fit between a pair of spaced lugs. The lugs project endwise from the block and downwardly below the inner faces 25. The centers of the pivot holes 29 in the lugs lie outside of the end face 30 of the block so that in the pivoted relation there is a space 31 between the blocks (Fig. 1).

By inspection of Fig. 1 it is obvious that as the chain curves over the sprocket the space 31 between the serrated tops of the blocks increases from that designated 31 in the flat upper run of the chain to that designated 32 in the curved relation of the chain. This is due to the increased linear velocity in the points of the top face of the block as they pass over the sprocket. On the other hand, the space 31 between the bottom faces 25 of the blocks remains unchanged in passing over the sprocket because the pivots lie in the planes of these faces. Thus the bottom faces 25 approach the sprocket as the inside of a belt approaches a pulley.

The sprocket which I have herein shown comprises a casting (Fig. 6) having sleeve 33, web 34, periphery 35, and side flanges 36. The sprocket is carried by a shaft 37 supported in the bearings 19 above mentioned as secured to the track member at brackets 18. The end 38 of the shaft is shown broken off, beyond which point it is connected to suitable power means (not shown). The periphery of the sprocket comprises a plurality of flat spots 39 adapted to abut the faces 25 of the chain blocks. Valleys or depressions 40 are formed between the flat spots and are suitably shaped to receive the lugs 27 and 28 in the relation existing in the curved position of the chain over the sprocket. The fitting of the lugs into the valleys of the sprocket ensures a positive engagement of the chain and sprocket and accurate positioning of the links on the sprocket to ensure a uniform and even pull on the chain. The character of chain provided results in the chain blocks dropping gently into place without any creeping or sliding action relative to the sprocket in approaching a meshing position. In other words, each flat spot 39 on the sprocket and each face 25 of the block are hinged together as they mesh by the pivotal relation described so that these two faces open and close together as the pages of a book.

The function of the side flanges 36 is to receive the chain from the rails 14 and guide it over the sprocket in the same vertical plane so that there will be no lateral deviation in the travel of the chain which may result in uneven and jerky power distribution from the sprocket to the chain.

It will be observed from Fig. 2 that the rails 14 are of sufficient height to provide a space between them in which the depending lugs 27, 28, may travel. The bearing surfaces of the rails extend above the centers of the pivot pins 26 of the blocks resting on said rails.

I claim as my invention:

1. A chain feed mechanism for a machine of the class referred to comprising, in combination, an endless chain of blocks pivoted together, each block having a single lug at one end and two lugs at the other end adapted to receive between them one of the single lugs on the next block said lugs projecting inwardly from the inner faces of said blocks, a pivot pin passing through each set of said interfitting lugs in the planes of the inner faces of said blocks, and a driving sprocket for said chain having peripheral faces adapted to engage with said inner faces of the blocks.

2. In a machine of the class referred to, in combination with a machine frame, a pair of parallel guides, a sprocket wheel, an endless chain of blocks supported by said guides, each of said blocks having planar under faces, means on said underfaces cooperating with said guides said guides and sprocket being arranged for passage of the chain from the guides over the sprocket, lugs on said blocks hinged together in the plane of said faces and projecting below the body of the block, said sprocket having flat faces thereon to register with said faces on the blocks and having depressions in its periphery to receive said lugs whereby to effect a positive driving relation between the sprocket and the chain.

3. A block for an endless chain having a body portion with a flat serrated top adapted to grip material carried by the chain, said body having on the underside grooves for guides which support and guide the chain, said block having a single lug at one end and spaced lugs at the other end, the spaced lugs being positioned between the grooves of the body so as to pass between the guides, and the single lug being adapted to enter between the pair of spaced lugs on another similar block in the chain, said lugs having holes therein for pivot pins.

4. A block for an endless chain having on the under side grooves for guides which support and guide the chain, said block having a single lug at one end and spaced lugs at the other end, the spaced lugs being positioned between said grooves so as to pass between the guides, and the single lug being adapted to enter between the pair of spaced lugs on another similar block in the chain, said lugs having holes therein for pivot pins, and the bottom face of the block lying in the plane of the centers of said pivot holes.

5. In a block for an endless chain the combination of a body, means on said body by which the block is adapted to be incorporated in the endless chain, said block having on the under face a plurality of grooves for guides which support and guide the chain.

6. An endless chain made up of similar blocks linked together, each of said blocks having grooves longitudinally thereon for guides which support and guide the chain, said grooves on one block being a continuation of the grooves on the adjacent blocks to form continuous grooves throughout the length of the chain.

7. In a chain feed device for feeding work pieces longitudinally through a woodworking machine, the combination of a pair of laterally spaced ways extending longitudinally of the machine, a pair of sprockets rotatably supported one at each end of said ways, an endless chain extending about said sprockets and having its upper length intermediate the sprockets supported on said ways, said chain comprising a plurality of pivotally connected blocks having longitudinal grooves on their inner faces for slidably engaging said ways and having serrated outer surfaces for engaging the work.

8. A chain feed mechanism for a machine of the class described, comprising in combination, and endless chain of blocks having flat inner surfaces and having lugs projecting from their ends inwardly beyond said flat faces, said lugs being pivoted together in the plane of said flat faces, a sprocket wheel having flat faces on its periphery adapted to register with the flat faces of said blocks and having valleys between said flat faces shaped to fit and receive said lugs as the chain passes around said sprocket, a pair of laterally spaced guides for supporting the upper run of said chain, said blocks having grooves in their inner surfaces adapted to cooperate with said guides, said grooves and said guides being spaced apart so that said lugs may pass between said guides.

9. In a chain feed device for feeding work pieces through a wood working machine, the combination of a pair of sprockets rotatably mounted on parallel axes and in spaced relation to each other, a plurality of pivotally connected links forming an endless chain extending about said sprockets, each of said links having a groove formed in the inner side thereof and extending in the direction of travel of the chain, and guide means adjacent to the inner side of one run of the chain and adapted to engage said sides of the grooves in said links to prevent transverse displacement of the links as they pass said guide means.

10. In a chain feed device for feeding work through a wood working machine, the combination of a pair of sprockets rotatably mounted on parallel spaced axes, an endless chain extending about said sprockets, said chain comprising a plurality of links each having a body portion with an outer surface against which the work may bear and each link also having integrally formed hinge lugs at opposite ends extending inwardly with relation to said body portion and said outer surface, and means pivotally connecting the lugs of the links together, each of said links having a groove formed in the inner surface of an integral portion thereof and extending in the direction of travel of the chain, and guide means adjacent to one run of the chain adapted to engage said grooves to prevent transverse displacement of the links.

In testimony whereof, I have hereunto affixed my signature.

CARL L. MATTISON.